FREDERIK JOHAN CONSTANTIJN BARON VAN HARDENBROEK VAN AMMERSTOL.
CALCULATING DEVICE.
APPLICATION FILED DEC. 3, 1914.

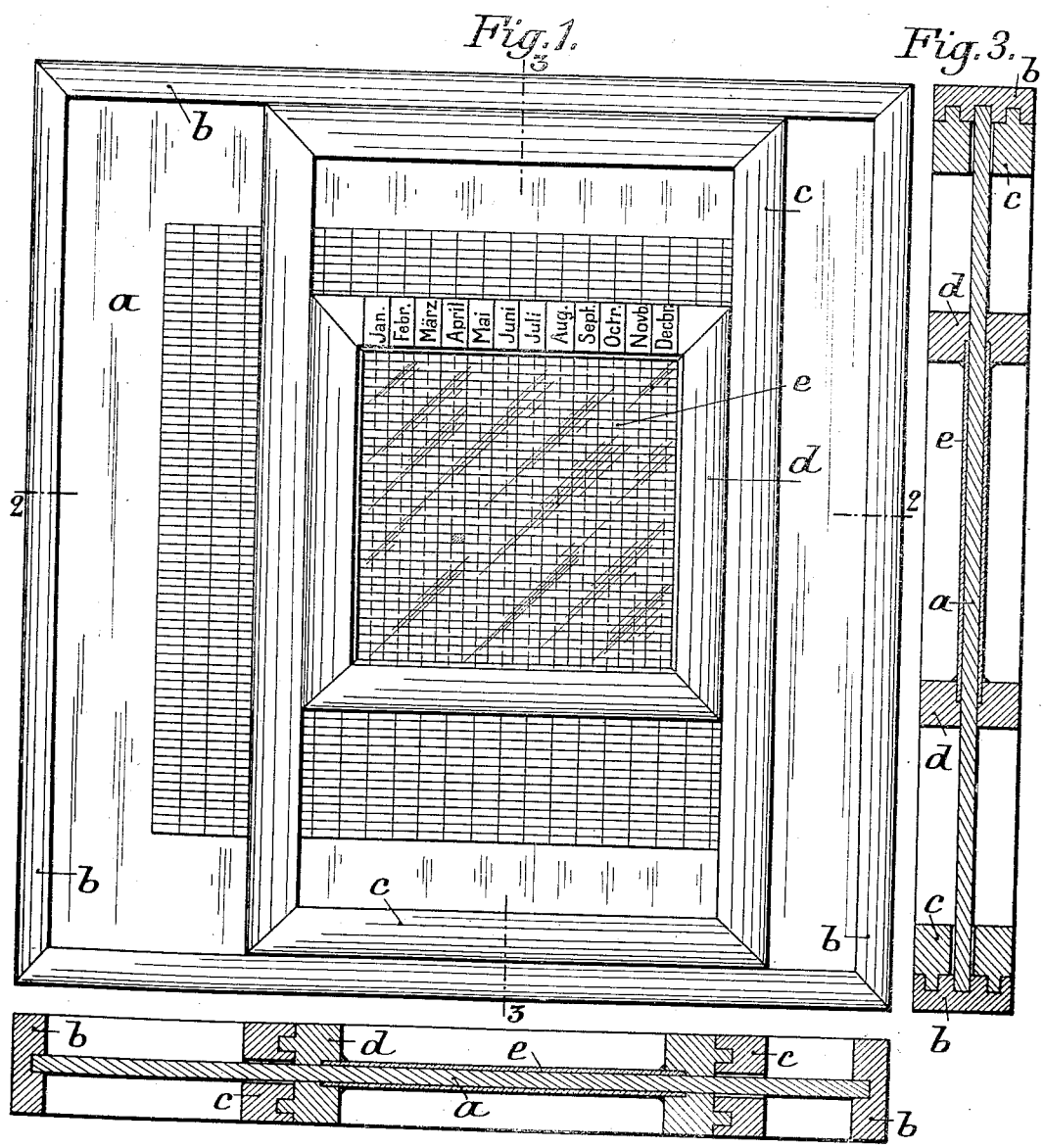

1,162,828.

Patented Dec. 7, 1915.
3 SHEETS—SHEET 2.

Fig. 4.

FREDERIK JOHAN CONSTANTIJN BARON VAN HARDENBROEK VAN AMMERSTOL.
CALCULATING DEVICE.
APPLICATION FILED DEC. 3, 1914.

1,162,828.

Patented Dec. 7, 1915.
3 SHEETS—SHEET 3.

*Fig.5.*

| JANUAR | FEBRUAR | MÄRZ | APRIL | MAI | JUNI | JULI | AUGUST | SEPTBR. | OCTBR. | NOVBR. | DECBR. |
|---|---|---|---|---|---|---|---|---|---|---|---|
| 1 |   | 2 | 1 | 1 |   |   |   |   |   |   |   |
| 2 | 1 | 3 | 2 | 2 | 1 | 1 |   |   |   |   |   |
| 3 | 2 | 4 | 3 | 3 | 2 | 2 | 1 |   |   |   |   |
| 4 | 3 | 5 | 4 | 4 | 3 | 3 | 2 | 1 | 1 |   |   |
| 5 | 4 | 6 | 5 | 5 | 4 | 4 | 3 | 2 | 2 | 1 | 1 |
| 6 | 5 | 7 | 6 | 6 | 5 | 5 | 4 | 3 | 3 | 2 | 2 |
| 7 | 6 | 8 | 7 | 7 | 6 | 6 | 5 | 4 | 4 | 3 | 3 |
| 8 | 7 | 9 | 8 | 8 | 7 | 7 | 6 | 5 | 5 | 4 | 4 |
| 9 | 8 | 10 | 9 | 9 | 8 | 8 | 7 | 6 | 6 | 5 | 5 |
| 10 | 9 | 11 | 10 | 10 | 9 | 9 | 8 | 7 | 7 | 6 | 6 |
| 11 | 10 | 12 | 11 | 11 | 10 | 10 | 9 | 8 | 8 | 7 | 7 |
| 12 | 11 | 13 | 12 | 12 | 11 | 11 | 10 | 9 | 9 | 8 | 8 |
| 13 | 12 | 14 | 13 | 13 | 12 | 12 | 11 | 10 | 10 | 9 | 9 |
| 14 | 13 | 15 | 14 | 14 | 13 | 13 | 12 | 11 | 11 | 10 | 10 |
| 15 | 14 | 16 | 15 | 15 | 14 | 14 | 13 | 12 | 12 | 11 | 11 |
| 16 | 15 | 17 | 16 | 16 | 15 | 15 | 14 | 13 | 13 | 12 | 12 |
| 17 | 16 | 18 | 17 | 17 | 16 | 16 | 15 | 14 | 14 | 13 | 13 |
| 18 | 17 | 19 | 18 | 18 | 17 | 17 | 16 | 15 | 15 | 14 | 14 |
| 19 | 18 | 20 | 19 | 19 | 18 | 18 | 17 | 16 | 16 | 15 | 15 |
| 20 | 19 | 21 | 20 | 20 | 19 | 19 | 18 | 17 | 17 | 16 | 16 |
| 21 | 20 | 22 | 21 | 21 | 20 | 20 | 19 | 18 | 18 | 17 | 17 |
| 22 | 21 | 23 | 22 | 22 | 21 | 21 | 20 | 19 | 19 | 18 | 18 |
| 23 | 22 | 24 | 23 | 23 | 22 | 22 | 21 | 20 | 20 | 19 | 19 |
| 24 | 23 | 25 | 24 | 24 | 23 | 23 | 22 | 21 | 21 | 20 | 20 |
| 25 | 24 | 26 | 25 | 25 | 24 | 24 | 23 | 22 | 22 | 21 | 21 |
| 26 | 25 | 27 | 26 | 26 | 25 | 25 | 24 | 23 | 23 | 22 | 22 |
| 27 | 26 | 28 | 27 | 27 | 26 | 26 | 25 | 24 | 24 | 23 | 23 |
| 28 | 27 | 29 | 28 | 28 | 27 | 27 | 26 | 25 | 25 | 24 | 24 |
| 29 | 28 | 30 | 29 | 29 | 28 | 28 | 27 | 26 | 26 | 25 | 25 |
| 30 |   | 31 | 30 | 30 | 29 | 29 | 28 | 27 | 27 | 26 | 26 |
| 31 |   |   |   | 31 | 30 | 30 | 29 | 28 | 28 | 27 | 27 |
|   |   |   |   |   |   | 31 | 30 | 29 | 29 | 28 | 28 |
|   |   |   |   |   |   |   | 31 | 30 | 30 | 29 | 29 |
|   |   |   |   |   |   |   |   |   | 31 | 30 | 30 |
|   |   |   |   |   |   |   |   |   |   |   | 31 |

WITNESSES

INVENTOR
Frederik Johan Constantijn
Baron van Hardenbroek van Ammerstol
ATTY.

UNITED STATES PATENT OFFICE.

FREDERIK JOHAN CONSTANTIJN BARON van HARDENBROEK van AMMERSTOL, OF UBBERGEN, NETHERLANDS.

CALCULATING DEVICE.

1,162,828.   Specification of Letters Patent.   Patented Dec. 7, 1915.

Application filed December 3, 1914. Serial No. 875,375.

*To all whom it may concern:*

Be it known that I, FREDERIK JOHAN CONSTANTIJN BARON VAN HARDENBROEK VAN AMMERSTOL, secretary of the army, a subject of the Queen of the Netherlands, residing at Ubbergen, Netherlands, have invented certain new and useful Improvements in Calculating Devices; and I do hereby declare the following to be a full, clear, and exact description of the invention, such as will enable others skilled in the art to which it appertains to make and use the same.

My invention relates to calculating devices for determining results involving elapsed time as one factor, such, for instance, as the number of days between two dates, or the interest at a certain annual rate payable on one dollar for the time between two definite dates; and the object of the invention is to provide a device of this kind wherein the result may be read directly at one of the dates when the other date is registered with an index. In the preferred form of construction, the results are arranged on a fixed table, and the dates are arranged on a transparent slide movable over the table to bring any date into registry with an index on the table, the slide being carried in a guiding structure which is likewise applicable to other forms of calculating devices.

In the accompanying drawings illustrating this preferred form of construction in application to a calculating device for determining the number of days between two dates, as an example, Figure 1 is a plan view of the calculating device; Figs. 2 and 3 are sections on lines 2—2 and 3—3 of Fig. 1, respectively; Fig. 4 represents the results arranged on the fixed table; and Fig. 5 represents the dates arranged on the movable slide.

A rectangular plate $a$ of wood, slate or other suitable material is fastened within a wooden inclosing frame $b$ which projects outwardly of both faces thereof and has longitudinally extending guiding grooves on the inner surface of its top and bottom members along each face of the plate. There is a rectangular frame $c$ along each face of the plate $a$, and each frame has longitudinally extending tongues fitted in the grooves of the frame $b$. Each frame $c$ is provided along the inner surface of its side members with guiding grooves in which the frame $d$ slides transversely. Each frame $d$ carries a transparent slide $e$ divided into twelve columns corresponding to the twelve months of the year, and into a number of rows, the values being inserted at one side of the areas of intersection of the columns and rows. The plate $a$ is provided with a table divided into a plurality of columns and rows, the results being inserted at the other side of the areas of intersection thereof, and it is also provided with an index positioned centrally of the table, as shown, that is, in the area of intersection of one of the intermediate columns with one of the intermediate rows. The guiding structure is such that any value on the slide may be brought over the index of the table by moving the frame $c$ longitudinally in the frame $b$ and moving the frame $d$ transversely in the frame $c$. When any value on the slide is so registered, then the intersecting areas on the slide lie directly over the intersecting areas on the table, and the values on the slide are contiguous to the results on the table, so that the result of the calculation is visible through the slide at the immediate right of the determining value on the slide.

The slide is divided into twelve columns corresponding to the months of the year and into rows corresponding to the days of the month. The values in each column represent the consecutive days of the respective month and start in such manner that a constant interval of days exists between the two values of the same row in two adjacent columns. In the slide shown in Fig. 5, which is adapted for 365 days, the interval of days between sidewise adjacent values is 30, the value in one column starting one row lower than in the preceding column if the preceding month contains 31 days, and starting in the same row if the preceding month consists of 30 days. The first day in March is represented in the second row above the first day of February, since, in a year of 365 days, February contains but 28 days. Thus the slide of Fig. 5 has the varied arrangement shown and contains 36 rows.

The table of results shown in Fig. 4 is adapted for the calculation of the interval of days between any two definite dates on the slide of Fig. 5, and preferably the results are repeated as shown in order that a single setting of the slide suffices even if the two dates are in successive years or are near the beginning and end of any two months. Thus the table of results has 23 columns, equal to one less than double the number of columns on the slide, and 71 rows, likewise equal to one less than double the number of rows on the slide, the values in the same row of adjacent columns having a constant difference of 30, equal to the interval of days between dates on the slide lying in the same row of adjacent columns. The index, which is preferably colored or otherwise rendered distinctive, is placed to the left of the result 365 which forms the end of the first series of differences on the table, and also forms the zero point of the second series of differences; and inasmuch as this table is adapted for a year of 365 days, whereas the difference between sidewise adjacent results is 30, the results in the second series sets five rows lower than the corresponding results in the first series. The results are continued sufficiently above and below the row containing the index that every date on the slide is in registry with a result on the table, no matter what date on the slide is registered with the index.

The method of using the device having the values and results shown in Figs. 4 and 5 is as follows:—To determine the interval of days between any two dates of the same year, as for example April 5th and July 16th, the number 5 in the column of April is brought over the index, and 102 is read on the table at the right of number 16 in the column of July on the slide. Similarly, to find the interval of days between November 7th of one year and February 3rd of the next year, the number 7 of the column of November is registered with the index, and 88 is read from the first series of results at the right of number 3 in the column of February. The device may also be used to determine the date occurring at a definite number of days following any other date, by registering the given date with the index and reading the second date on the slide at the left of the given number of days on the table of results.

From the foregoing it will be understood that the results are determined by a single setting involving but a small amount of movement of the slide in any case. Also the figures on the slide and table stand upright and lie side by side when the slide is positioned for any problem.

Instead of adapting the table for the determination of the interval of days between two definite dates, the results may represent any determination in which the interval of days on the slide is a factor. For instance, the results may represent at a given annual rate, the interest per dollar from 1 to 365 days. The second face of the table $a$ may contain a table of results of this kind, or it may be arranged for determining the number of days between two dates when the year is divided into twelve months of thirty days each. In the latter case, the slide would have thirty rows and the table of results would have fifty-nine rows, the figures on the slide and on the table starting in the top row of each column and ending in the bottom row thereof.

Having thus described my invention, what I claim is:

1. In a calculating device of the kind described, a transparent slide bearing a single series of unrepeated dates arranged in twelve columns corresponding to the months of the year and in rows corresponding to the days of the month, a fixed table bearing a plurality of series of repeated results arranged in columns and rows so as to register individually with the dates on the slide and having an index intermediate of said series, and guiding means whereby the slide is movable over the fixed table to bring any date on the slide into registry with the index.

2. In a calculating device of the kind described, a movable transparent slide divided into twelve columns corresponding to the months of the year and into rows corresponding to the days of the months so as to form a plurality of intersecting areas, a fixed table divided into columns and rows so as to form a plurality of intersecting areas like those of the slide, an index on the table positioned in such manner that when any intersecting area of the slide is registered with it, all the intersecting areas of the slide register respectively with the intersecting areas of the table, a series of dates arranged within the intersecting areas of the slide to one side thereof, and a series of results arranged within the intersecting areas of the table to the other side thereof, whereby when any one date is registered with the index a result appears through the slide directly at the side of every date.

3. In a calculating device of the kind described, a movable slide bearing dates arranged in twelve columns corresponding to the months of the year and in rows corresponding to the days of the month, a fixed table having an index and bearing results arranged in columns and rows so as to register individually with the dates on the slide when the slide is positioned relatively to the index, the results in the same row of adjacent columns of the fixed table having a constant difference, and the dates in the same row of adjacent columns of the slide representing an interval of thirty days.

4. In a calculating device of the kind described, a slide bearing dates arranged in rows forming at least twelve columns representing the months of the year, wherein the dates in the same row of adjacent columns represent a constant interval of days, and a fixed table bearing results arranged in at least twenty-three columns and in a number of rows equal as a minimum to one less than double the number of rows on the slide wherein the results in the same row of adjacent columns have a constant difference, said table having an index positioned at the intersection of one of the intermediate columns and one of the intermediate rows, and said slide being movable over the table to bring any one of the dates thereon into registry with the index.

In testimony whereof I have affixed my signature, in presence of two witnesses.

FREDERIK JOHAN CONSTANTIJN BARON
VAN HARDENBROEK VAN AMMERSTOL.

Witnesses:
W. R. ATKINSON,
EUGENE NABEL.